United States Patent [19]
Benedict

[11] Patent Number: 5,727,651
[45] Date of Patent: Mar. 17, 1998

[54] OIL PAN FOR A BOAT

[76] Inventor: Doug M. Benedict, 1276 Westbrook Rd., Dayton, Ohio 45415

[21] Appl. No.: 677,385

[22] Filed: Jul. 9, 1996

[51] Int. Cl.⁶ ............................................. F16C 3/14
[52] U.S. Cl. .................... 184/1.5; 184/106; 220/573; 220/666; 141/98
[58] Field of Search ................... 220/6, 573, 666, 220/558; 184/106, 1.5; 141/98

[56] References Cited

U.S. PATENT DOCUMENTS

| | | | |
|---|---|---|---|
| 1,680,191 | 8/1928 | Woolf | 220/666 |
| 3,354,924 | 11/1967 | Birrell et al. | 220/666 |
| 3,367,380 | 2/1968 | Dickey | 220/573 |
| 3,727,803 | 4/1973 | Cobb | 222/215 |
| 4,157,103 | 6/1979 | La Fleur . | |
| 4,442,936 | 4/1984 | Densham | 200/223 |
| 4,651,791 | 3/1987 | Evenson . | |
| 4,850,509 | 7/1989 | Hollenberg | 220/462 |
| 5,174,458 | 12/1992 | Segati | 220/666 |
| 5,316,386 | 5/1994 | Moore | 220/573 |
| 5,379,862 | 1/1995 | Schmidt et al. | 184/106 |
| 5,429,437 | 7/1995 | Shaw et al. . | |

*Primary Examiner*—Thomas E. Denion
*Attorney, Agent, or Firm*—Thompson Hine & Flory LLP

[57] ABSTRACT

An expandable pan and method for collecting oil from a boat's engine in an environmentally and ecologically safe manner. The pan comprises a bottom, a back wall, a front wall and collapsible sidewalls, all extending upwardly from the bottom such that a well for collecting oil is created within. The sidewalls are expandable such that the front wall is movable away from the back wall such that the oil can flow into the well.

7 Claims, 2 Drawing Sheets

OIL PAN FOR A BOAT

BACKGROUND OF THE INVENTION

The present invention relates to draining and collecting oil from a boat's engine, more particularly, the invention provides an expandable oil pan for use with boats for collecting oil from a boat's engine and transferring the oil to a recovery container for recycling in an environmentally and ecologically safe manner.

Typically, oil from a boat's engine is drained directly into the boat's hull or bilge after removing the drain plug. Once the oil is collected in the hull or bilge, the oil is pumped over the side of the boat or drained out the hull drain plug at the stern of the boat. A mild detergent is then dumped into the hull to clean the remaining oil. The resultant oily mixture is then also pumped over the side of the boat or drained out the hull drain plug onto the water or land depending upon the location of the boat. This procedure is not environmentally and ecologically safe.

An alternative procedure for draining the oil from a boat's engine includes siphoning the oil out of the engine through the dip stick tube, which leaves large amounts of sludge in the engine's oil pan. This procedure is slow and tedious.

U.S. Pat. No. 5,379,862 to Schmidt et al. discloses a quick change expandable oil pan having expandable side walls with vertically oriented accordion folds. The pan is placed under the boat's engine and is expanded vertically until the pan engages the oil drain plug.

Accordingly, there is a need for an environmentally safe, effective, efficient and relatively easy method of draining the oil from a boat's engine.

SUMMARY OF THE INVENTION

The present invention provides an expandable oil pan and method for collecting and transferring the oil being drained from a boat's engine to a recovery container, easily, effectively and efficiently, without resultant damage to the environment.

A preferred embodiment of the present invention is an expandable pan for collecting oil being drained from a boat's engine. The expandable pan includes a bottom, a back wall, a front wall, and collapsible sidewalls. All of the walls extend upwardly from the bottom such that a well is formed within the walls. The bottom includes at least one spout for transporting the oil through a hose attached to the spout to a recovery container for recycling.

Accordingly, it is an object of the present invention to provide an expandable pan for collecting oil from a boat's engine in an environmentally safe, effective, efficient and relatively easy manner; and to safely transfer the oil from the expandable pan to a recovery container for recycling.

DETAILED DESCRIPTION

Figure 1:
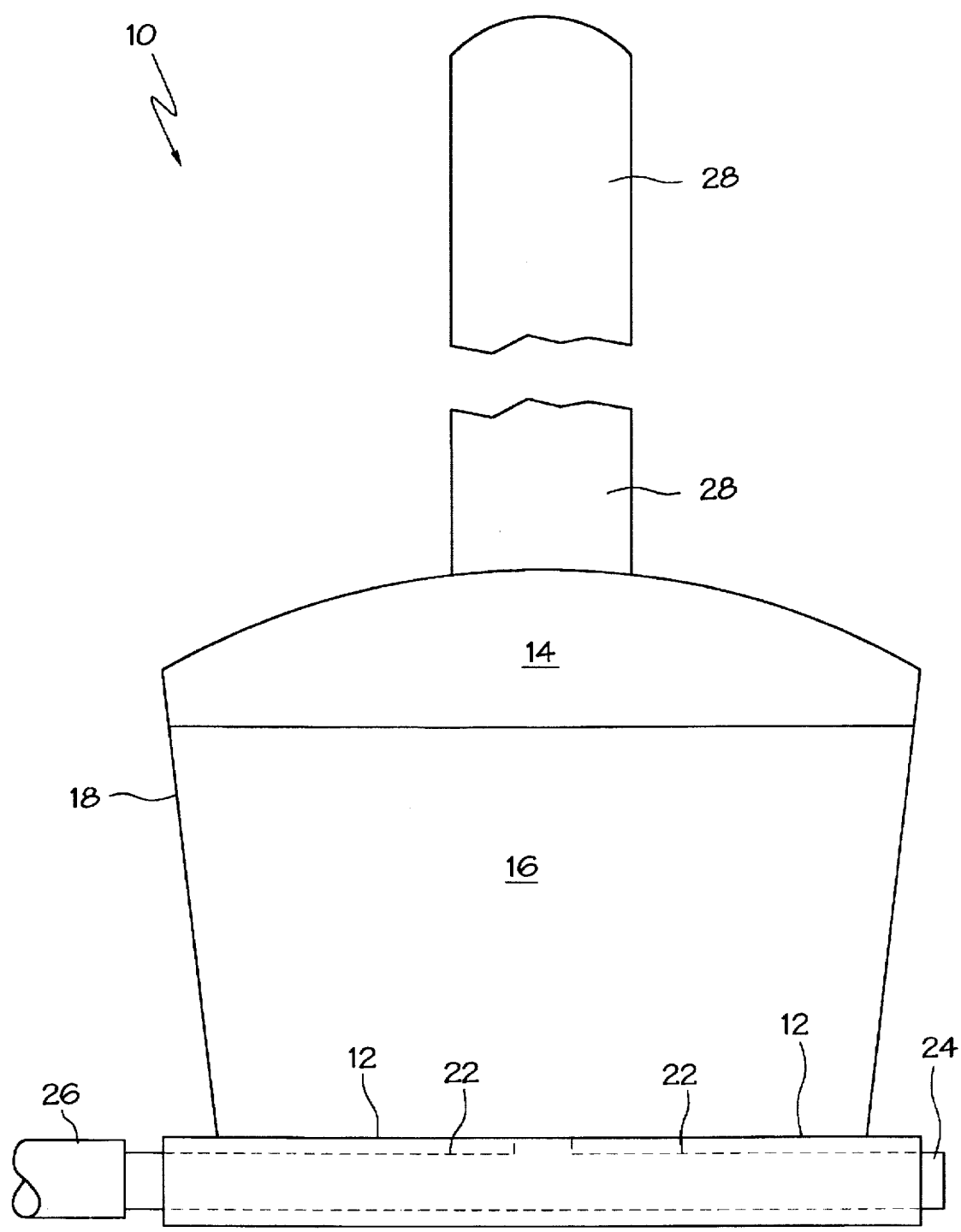
FIG. 1 is a front elevational view of a preferred embodiment of the present invention.

As shown in FIG. 1, the present invention is an expandable pan, generally designated 10. The expandable pan 10 includes a bottom 12, a back wall 14, a front wall 16, and a pair of collapsible sidewalls 18. All of the walls 14, 16 and 18 extend upwardly from the bottom 12 such that a well 20 is formed within the walls. The sidewalls 18 are expandable. Preferably, the sidewalls 18 include accordion folds, more preferably, horizontally oriented accordion folds.

In using expandable pan 10, pan 10 in its collapsed state is inserted along side or under the boat's engine in the engine compartment, such that oil from the engine will drain into the pan 10. The pan 10 is then expanded manually by forcing the front wall 16 away from the back wall 14 thereby expanding the sidewalls 18 and correspondingly increasing the capacity of the well 20 so that oil from the boat's engine drains into the well 20 after the engine's drain plug is removed, as shown in FIG. 1. Preferably, the back wall 14 is stationary or fixed relative to the front wall 16.

Alternatively, the sidewalls 18 may be expanded as the oil flows into the well 20 during draining from the boat's engine. The front wall 16 is forced away from the back wall 14 increasing the capacity of the well 20 as the oil flows into the well 20 and the sidewalls 18 expand.

Figure 2:
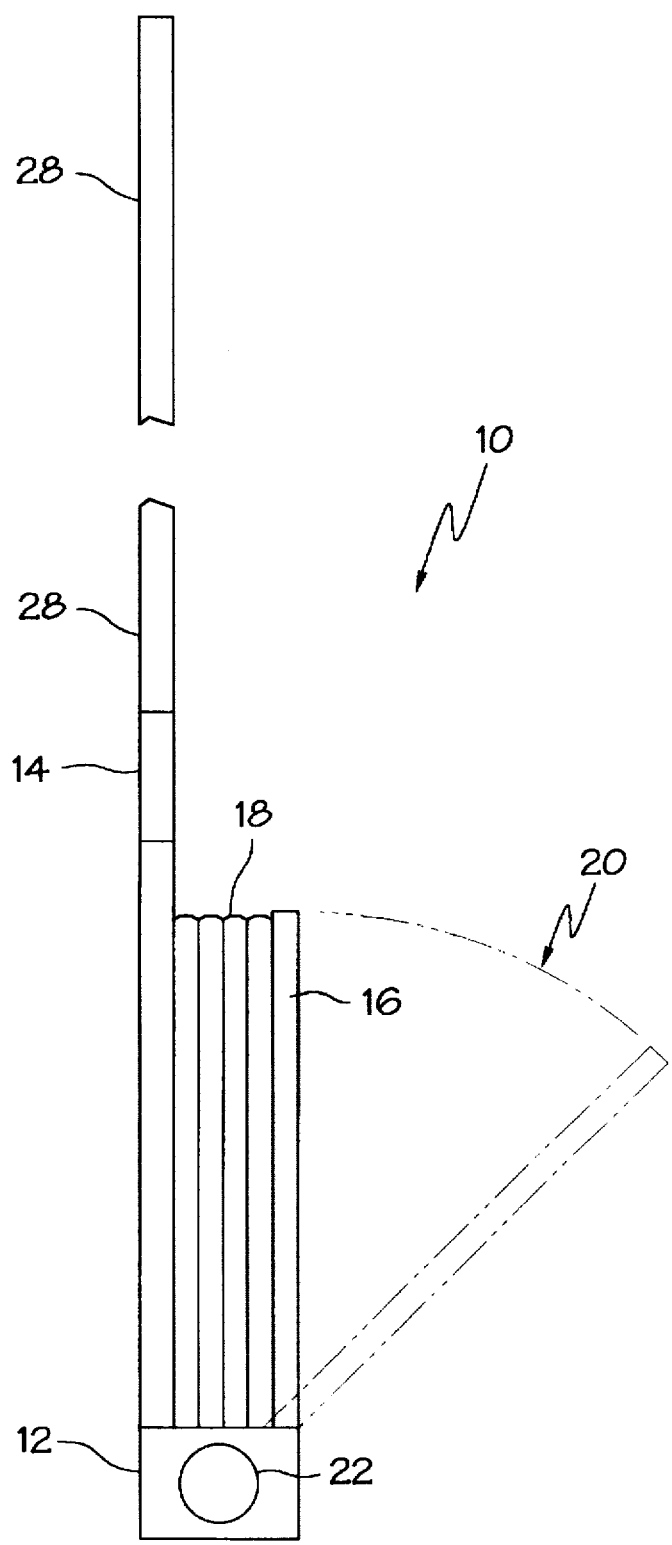
FIG. 2 is a side elevational view of a FIG. 1 showing the pan in a collapsed state and in an expanded state in phantom.

In a preferred embodiment, the bottom 12 includes two spouts, generally designated 22 as shown in FIG. 2, that are connected to the bottom 12 such that oil flows away from the bottom 12 through at least one of the spouts 22, the active spout. The spouts 22 are arranged to accommodate use of the pan 10 in different orientations. Generally, when the pan 10 is used in one orientation, a cap 24 is preferably used to engage the non-active spout 22 when it is undesirable for oil to flow through the spout 22 away from the bottom 12. A hose 26 is attached to the active spout 22 to further transport the oil to a recovery container for recycling. Oil must be substantially transferred from the pan 10 to a recovery container prior to removal of the pan 10 from the engine compartment so that the pan 10 can be returned to its collapsed state.

It is desirable that the expandable pan 10 is configured to be placed within the engine compartment of the boat. Preferably, the back wall 14 is of sufficient height such that the oil being drained into the expandable pan 10 is directed into the well 20 directly or after contacting the back wall 14. More preferably, the back wall 14 includes a handle portion 28 for easy insertion and removal of the expandable pan 10 from the engine compartment. The configuration of the pan 10 is such that the pan 10 is able to expand to fit the angular configuration of a boat hull in which it is used.

The expandable pan 10 is preferably placed along side or under the boat's engine, depending upon the location of the drain plug for the engine's oil pan, such that the oil will flow into the well 20 of the expandable pan 10 after the drain plug has been removed.

By way of example, without desiring to be limited, any suitable material can be used to make the expandable pan 10. Preferably, the pan 10 is made from oil resistant plastic.

Those skilled in the art will appreciate that modifications and additions to the present invention are not outside the scope of the present invention.

What is claimed is:

1. A method for draining and collecting oil from a boat's engine in an environmentally safe manner comprising:
   providing a boat's engine having an oil pan with a drain plug;
   providing an expandable pan configured to fit boat hulls of angular configuration for collecting oil from a boat's engine, said pan including a bottom, a back wall, a front wall, and collapsible pleated sidewalls, wherein all of the walls and sidewalls extend upwardly from said bottom such that a well for collecting oil is formed within said walls, wherein said sidewalls include accordion folds;

inserting said pan along side or under said boat's engine in the engine compartment such that said oil will flow into said well of said pan;

expanding said well by manually forcing said from wall away from said back wall, such that said well acquires a substantially "V"-shaped configuration;

removing said drain plug; and collecting said oil in said well as said oil flows into said well.

2. The method of claim 1 wherein said back wall is held stationary while said front wall is forced away from said back wall.

3. The method of claim 1 wherein said back wall includes a handle portion on a top edge such that said pan can be inserted into a compartment housing said engine.

4. The method of claim 1 wherein said back wall is of sufficient height such that the oil being drained into said pan is directed into said well directly or after contacting said back wall.

5. The method of claim 1 wherein said bottom includes at least one spout for transferring said oil away from said pan.

6. The method of claim 5 wherein said spout includes a removable cap that prevents said oil from being directed away from said pan when said cap is engaged.

7. The method of claim 5 wherein said spout includes a hose through which said oil can flow from said pan to a container.

* * * * *

UNITED STATES PATENT AND TRADEMARK OFFICE
CERTIFICATE OF CORRECTION

PATENT NO. : 5,727,651
DATED : March 17, 1998
INVENTOR(S) : Doug M. Benedict

It is certified that error appears in the above-indentified patent and that said Letters Patent is hereby corrected as shown below:

Claim 1, col. 3, line 4, the word "from" should be --front--.

Signed and Sealed this

Second Day of June, 1998

Attest:

BRUCE LEHMAN

*Attesting Officer*    *Commissioner of Patents and Trademarks*